Figure 1:
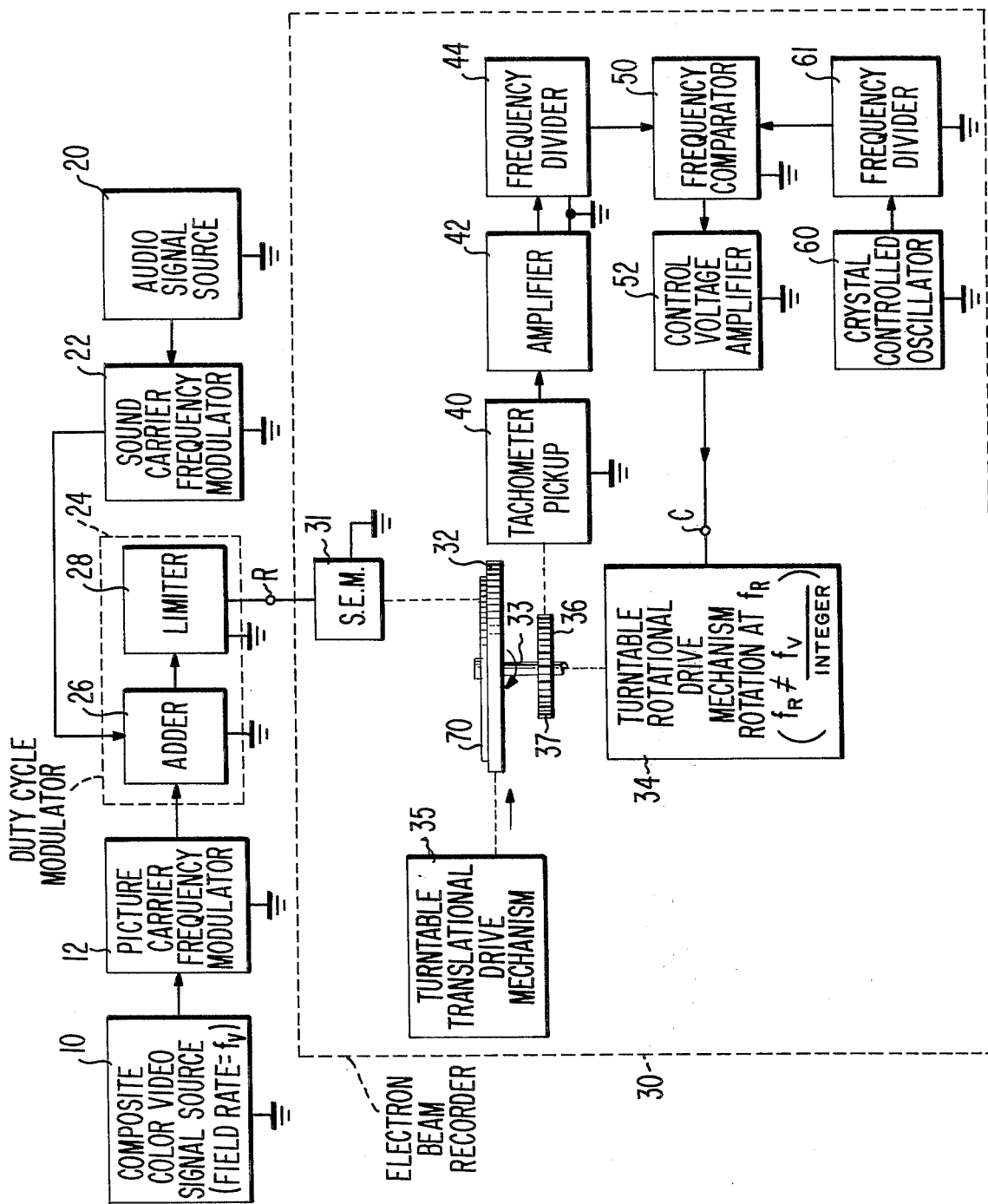

United States Patent [19]
Keizer

[11] 4,018,984
[45] Apr. 19, 1977

[54] VIDEO DISC RECORD HAVING SPIRALLY ALIGNED SYNC STORAGE LOCATIONS

[75] Inventor: Eugene Orville Keizer, Princeton, N.J.

[73] Assignee: RCA Corporation, New York, N.Y.

[22] Filed: Nov. 12, 1974

[21] Appl. No.: 522,820

[52] U.S. Cl. .............................. 358/128; 274/42 R; 358/4

[51] Int. Cl.² ......................................... H04N 5/76

[58] Field of Search ....... 178/6.6 R, 6.6 PD, 6.7 A; 179/100.3 V, 100.1 B; 274/42 R; 358/4, 8

[56] References Cited

UNITED STATES PATENTS

| | | | |
|---|---|---|---|
| 3,796,825 | 3/1974 | Redlich et al. .............. | 178/6.6 DD |
| 3,842,194 | 10/1974 | Clemens ......................... | 274/42 R |
| 3,934,262 | 1/1976 | Snopko .................. | 358/4 |

*Primary Examiner*—Raymond F. Cardillo, Jr.
*Attorney, Agent, or Firm*—Eugene M. Whitacre; William H. Meagher

[57] ABSTRACT

Video disc record is provided with a spiral information track containing recorded representations of composite video signals. The information representations occupying the length of each convolution of the spiral depart slightly from an integral number of field intervals by a fixed amount. The departure amount is such that the information content per spiral convolution corresponds to a given integral number of line intervals plus a predetermined fraction of a line interval (other than one-half). Synchronizing information locations in successive convolutions are thus staggered in a spiral manner. Recording apparatus for forming such a record includes apparatus for maintaining the rate of rotation of a recording turntable substantially constant at a rate which differs from an integral submultiple of the field rate of the composite video signals supplied to the recorder by an appropriate small amount.

6 Claims, 3 Drawing Figures

VIDEO DISC RECORD HAVING SPIRALLY ALIGNED SYNC STORAGE LOCATIONS

The present invention relates generally to novel video disc records and novel recording/playback apparatus and methods therefor, and particularly to a novel form of video disc record wherein synchronizing information locations in successive convolutions of a spiral information track are staggered in a spiral manner, to novel recording apparatus and methods for use in forming a record of such a "spiral sync" configuration, and to novel playback apparatus and methods for advantageous use with such a record.

In U.S. Pat. No. 3,842,194, issued on Oct. 15, 1974 to Jon K. Clemens, video disc playback systems of a variable capacitance form are disclosed. In an arrangement therein disclosed, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turntable; the capacitance variations are sensed to recover the recorded information.

In one particularly successful format employed for the groove bottom information track in practice of the Clemens invention, depressed areas extending across the groove bottom alternate with non-depressed areas, with the frequency of alternation varying with the amplitude of video signals subject to recording. The form of the recorded signal is thus a carrier frequency modulated in accordance with video signals. In an advantageous arrangement for recording such information on a pre-grooved video disc master, an electron beam subject to intensity modulation in accordance with FM picture carrier signals, impinges upon electron beam sensitive material in the master disc groove bottom, so that subsequent development leaves the desired relief pattern in the groove bottom. The copending application of Loren B. Johnston, Ser. No. 335,024, filed Feb. 23, 1973 and entitled "Electron beam Recording In Thick Materials", now U.S. Pat. No. 3,943,302, contains a description of advantageous recording techniques that may be employed in such relief pattern development. The copending application of R. W. Jebens, et al., Ser. No. 349,775, filed on Apr. 10, 1973 and entitled "Precision Turntable Rotation In A Vacuum Atmosphere" now U.S. Pat. No. 3,943,275, describes suitable apparatus for achieving precise control of the rotation of a disc-supporting turntable in a recording system of the above-described electron beam recording type.

In an illustrative application of the principles of the present invention, the rotation rate of a recording master disc in an electron beam recorder is controlled, by apparatus of the general form described in said Jebens, et al application, so as to differ slightly from a subharmonic of the field rate of the video signal information content of the recording signal input supplied to the recorder. The degree of difference is precisely controlled so that the video information content per convolution of the spiral recorded information track corresponds to a given integral number of line intervals plus a predetermined fraction of a line interval, with the predetermined fraction desirably being other than ½.

In the developed master, and in replica discs derived therefrom (for example, by replication methods of the type described in said Clemens patent), horizontal synchronizing information storage locations in successive convolutions of the spiral information track are staggered in a spiral manner. In playback of a disc having the aforesaid spiral sync format, separation of horizontal sync signals from the composite video signals recovered from the disc provides recurring information which is indicative, by way of its phasing, of the occurrence of a departure from the normal progression of traversals of successive track convolutions by the player's signal pickup. With the aforementioned line interval fraction choice of other than one-half, the direction of such departure is indicated moreover. As explained more fully in a copending application Ser. No. 522,817, of Thomas W. Burrus, filed concurrently herewith and entitled "Locked Groove Detection And Correction In Video Disc Playback Apparatus", and now issued as U.S. Pat. No. 3,963,860, use may be made of such occurrence indication to automatically detect and correct and undesired mode of player operation involving repetitive replays of information recorded in given convolutions of the spiral information track.

In an illustrative embodiment of the record aspects of the present invention, the video information content per convolution of the spiral information track corresponds to 2097.9 line intervals (or 2.1 line intervals less than eight full field intervals, for a 525 line-per-frame-interval picture). In an illustrative embodiment of the player aspects of the present invention, a video disc player is provided with a turntable rotational drive system of a power line synchronous form (illustratively incorporating a synchronous motor) to effect rotation of the turntable at a rate corresponding to an integral submultiple of the power line frequency, with the specific example being 7.5 rps rotation rate for a power line frequency of 60 Hz. The player cooperates with a spiral sync disc of the above-specified 2097.9 lines-per-convolution standard to recover composite video signals with a U.S. color broadcast standard field rate of 59.94 fields per second (not harmonically related to the turntable rotation rate). Horizontal sync signals, separated from the composite video signals recovered from the record, indicate by a sustained phase advance a shift of signal pickup to an outwardly adjacent track convolution, in contrast with a sustained phase lag indication of a shift of signal pickup to an inwardly adjacent track convolution.

Objects and advantages of the present invention will be readily recognized by those skilled in the art upon a reading of the following detailed description, and an inspection of the accompanying drawings in which:

FIG. 1 illustrates partially by block diagram representation, video disc recording apparatus pursuant to a specific embodiment of recording aspects of the present invention.

Figure 2:
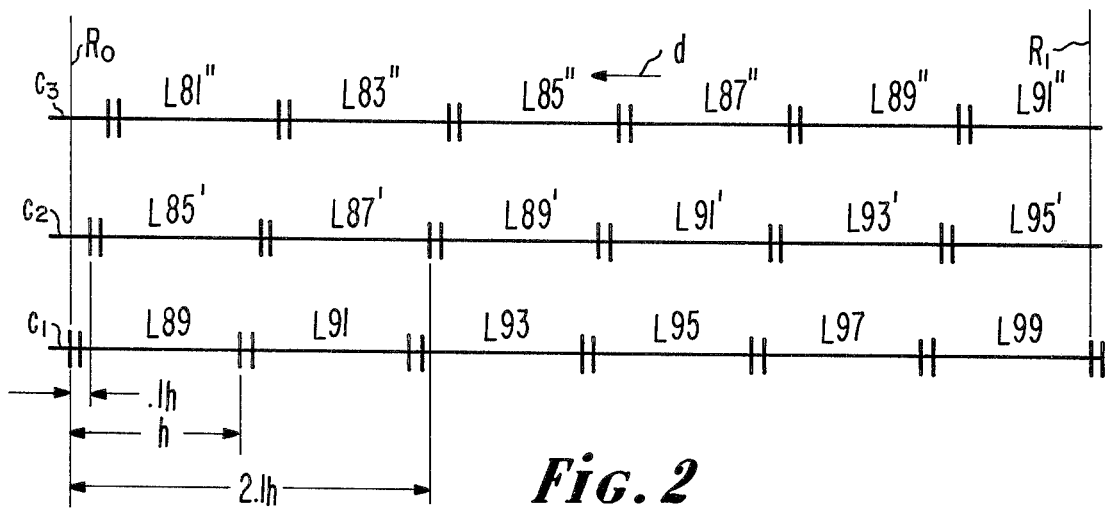
Figure 3:
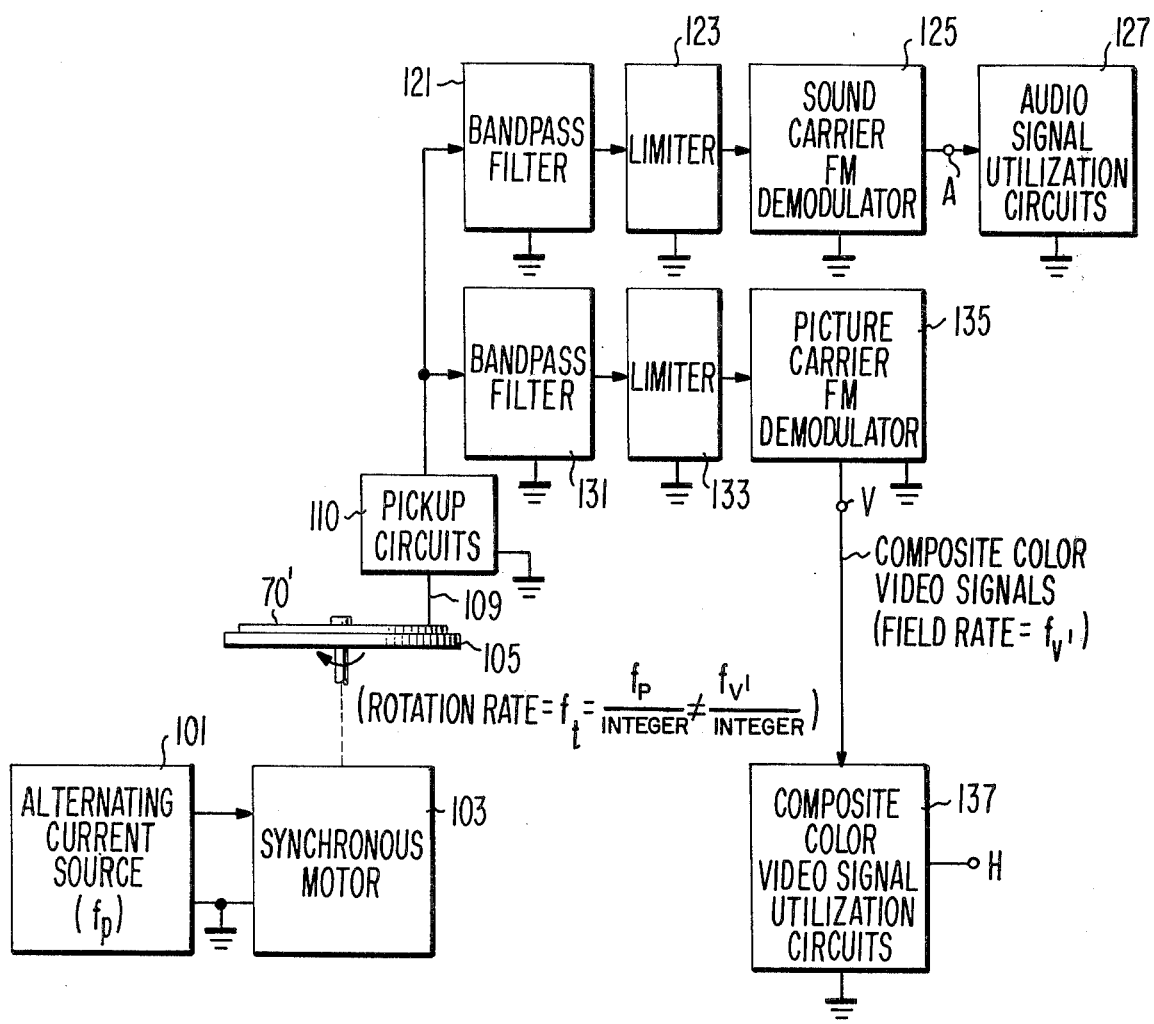

FIG. 2 illustrates diagrammatically the disposition of horizontal synchronizing information in successive convolutions of a spiral information track of a video disc record pursuant to a specific embodiment of record aspects of the present invention; and FIG. 3 illustrates, partially by block diagram representation, video disc playback apparatus pursuant to a specific embodiment of player aspects of the present invention.

In the arrangement of FIG. 1, an audio signal source 20 provides sound information appropriate for recording with the color picture information provided by a composite color video signal source 10, the latter providing composite color video signals having a field repetition rate of $f_v$.

The output of audio signal source 20 is applied to a sound carrier frequency modulator 22 to develop a first FM signal comprising carrier frequency waves varying in frequency about a relatively low center frequency in accordance with the amplitude of the source 20 output. A second FM signal is developed by the picture carrier frequency modulator 12 in response to the output of the composite color video signal source 10. The carrier frequency deviation range for modulator 12 occupies a relatively high frequency band, with the output of source 10 illustratively poled so that transitions from black toward white cause an increase in the picture carrier frequency.

Duty cycle modulation of the picture carrier wave output of modulator 12 is effected in accordance with the FM sound carrier wave output of modulator 22 by a duty cycle modulator 24, comprising an adder 26 for summing the two FM signals and a limiter 28 for double clipping the resultant sum. Reference may be made to my copending application, Ser. No. 441,069, filed on Feb. 11, 1974, now U.S. Pat. No. 3,911,476 for a more detailed discussion of the duty cycle modulation process here employed. The magnitude of the sound modulator output supplied to adder 26 is chosen so that its peak-to-peak amplitude is small relative to the peak-to-peak amplitude of the output of the picture carrier modulator 12, and double clipping level in limiter 28 are set with a spacing appreciably smaller than the peak-to-peak swing of the sound modulator output.

The output of the duty cycle modulator 24, appearing at the limiter output terminal R, serves as the recording signal input to an electron beam recorder 30 of the scanning electron microscope (SEM) type generally described in the above-mentioned Clemens patent. In the electron beam recorder, a scanning electron microscope 31 directs a beam of electrons upon the curved groove bottom of a pre-grooved recording master disc 70, the curved groove bottom surface comprising electron beam sensitive material. The disc 70 is supported by a turntable 32 which is subject to (a) rotational motion imparted by a turntable rotational drive mechanism 34, and (b) translational motion imparted by a turntable translational drive mechanism 35. The rotational and translational drives are interrelated in such manner that the electron beam path is intercepted in turn by successive regions along the length of successive convolutions of the disc's spiral groove in a regular inward progression toward the disc center. Reference may be made to the copending application of Robert W. Jebens, et al. Ser. No. 349,775, filed on Apr. 10, 1973 and entitled "Precision Turntable Rotation In A Vacuum Atmosphere", now U.S. Pat. No. 3,943,275, for an illustration of suitable apparatus for effecting the requisite controlled motion of the turntable 32.

Illustratively, the electron beam of SEM 31 is unblanked for the duration of each positive swing of the clipped signal at terminal R, and blanked for the duration of each negative swing of the clipped signal. The sweep rate for the SEM beam is considerably higher than the highest frequency of the picture carrier deviation range, while the beam sweep amplitude and unblanked beam intensity are substantially constant. As the disc record 70 rotates at a constant speed, a pattern of successive exposed and unexposed regions is produced along the length of the groove, with the lengths thereof (along the groove) determined by the respective swing durations of the recording signal input. Assuming, for example, that the master disc groove surface material is a positive resist, a subsequent development step will leave a pattern of alternating depressed and (relatively) non-depressed regions in the groove bottom corresponding to the pattern of exposed and unexposed regions, respectively.

Pursuant to the principles of the present invention, the speed of rotation of the disc 70 provided by the turntable rotational drive mechanism 34 is maintained substantially constant at a rotation rate of $f_R$, where $f_R$ differs slightly from an integral sub-multiple of $f_V$ by a controlled amount. The controlled amount is desirably such that the time required for SEM beam path interception by the groove bottom regions of a full convolution of the spiral groove of disc 70 corresponds to the time occupied by an integral number of line intervals plus a predetermined fraction, other than one-half, of a line interval, at the line repetition rate of the signals provided by source 10.

An illustrative arrangement for effecting control of the disc rotation rate, as shown in FIG. 1, employs a tachometer disc 36 carrying suitable indicia, illustratively comprising a selected number of regularly spaced markings 37 on its periphery. The disc 36 is mounted for rotation on the turntable shaft 33 to which turntable 32 is secured for rotation. A tachometer pickup 40, located adjacent the periphery of the rotating disc 36, responds to the passage of each disc marking 37 by developing an electrical pulse. Illustratively, the pickup 40 may comprise an optical sensor responsive to differences in light reflectance of marked and unmarked regions of disc 36 periphery passing through the sensor's limited field of view.

The signals developed by pickup 40 are amplified by amplifier 42 and then supplied to a frequency divider 44. A second frequency divider 61 receives the output of a reference crystal controlled oscillator 60. The outputs of the two frequency dividers are supplied to a frequency comparator 50. The frequency comparator 50 develops a control voltage output having an amplitude and polarity respectively indicative of the magnitude and sense of the departure, if any, of the frequency of the output of divider 44 from substantial frequency identity with the reference frequency of the output of divider 61. The output of frequency comparator 50 is amplified by control voltage amplifier 52 for delivery to a control terminal C of the turntable rotational drive mechanism 34.

Illustratively, the turntable rotational drive mechanism is of a fluid propulsion form, as described in detail in the aforesaid Jebens, et al. application. With such form of drive mechanism, the control voltage information available at terminal C may be applied to a suitable fluid control valve so as to effect the desired turntable speed regulation via control of the intensity of the propelling fluid stream (as illustrated in the aforementioned Jebens, et al. application).

In an illustrative application of the principles of the present invention, operating parameters for the FIG. 1 recording apparatus are chosen so that the recorded information content per convolution of the spiral groove of disc 70 corresponds substantially to 2097.9 line intervals, where the format of the video signals is such that a frame of two interlaced fields thereof comprises 525 line intervals. In this illustrative instance, the recorded information content duration per groove convolution differs from an integral number of field intervals by a small amount; i.e., being less than eight field intervals by an amount corresponding to 2.1 line intervals.

FIG. 2 presents a diagrammatic showing of the recorded information alignment that results in successive groove convolutions of disc 70 (and in replica discs derived therefrom) when the aforesaid illustrative choice of recording parameters is made. In the FIG. 2 diagram, vertically disposed lines $R_o$ and $R_1$ represent respective radii of the disc record, while horizontally disposed lines $c_1$, $c_2$ and $c_3$ represent aligned segments of the information track in three successive convolutions of the disc's sprial groove, with track segment $c_1$ lying in the outermost of the illustrated trio of convolutions. The portion of each track segment lying between $R_o$ and $R_1$ is of sufficient arcuate distance to encompass a video signal portion of a duration corresponding to six line intervals.

Illustratively, the six line portion of video signal information falling between radii $R_o$ and $R_1$ along convolution $c_1$ corresponds to intermediate lines 89, 91, 93, 95, 97 and 99 of an odd-line field. The track regions along this convolution ($c_1$) occupied by the recorded picture information for said lines of the odd-line field are designated generally by references L89, L91, L93, L95, L97 and L99 in FIG. 2. (It may be noted that primed references are used for corresponding designation of picture information regions in convolution $c_2$, and double primed references are used therefor in convolution $c_3$.) The track region occupied by recorded information representative of the horizontal sync pulse preceding each of the designated lines is bracketed by short vertical lines. The beginning of the recording location for the horizontal sync pulse preceding line 89 of the field occupying the illustrated segment of convolution $c_1$ is aligned with the radius $R_o$.

In the inwardly adjacent convolution $c_2$ of the information track, the track regions in the $R_o$–$R_1$ segment are again representative of intermediate lines in an odd-line field, but there is a slippage from radial alignment of information concerning corresponding lines. The beginning of the recording location for the horizontal sync pulse preceding line 89 of the field occupying the illustrated segment of convolution $c_2$ is shifted from $R_o$ by an arcuate distance corresponding to two and one-tenth line intervals (2.1 h). The beginning of the recording location for the horizontal sync pulse preceding line 89 of the field occupying the illustrated segment of convolution $c_3$ is shifted from the $c_2$ location in the same direction by the same (2.1h) amount. The shift is in a direction opposite to the direction of groove motion (designated by arrow $d$ in FIG. 2) relative to the recording beam path which occurs when disc 70 is rotated during the operation of the FIG. 2 apparatus. This is also the intended direction of groove motion relative to signal pickup for playback of a replica of disc 70.

As a consequence of the above-discussed degree of slippage from radial alignment in successive convolutions of information concerning ccorresponding lines, there is a net slippage from radial alignment in successive convolutions of horizontal sync pulse recording locations of a magnitude corresponding to one-tenth of a line interval (0.1H). Thus, for example, the beginning of the recording location for the horizontal sync pulse preceding line 85 of the field occupying the illustrated segment of convolution $c_2$ is shifted from $R_o$ by an arcuate distance of 0.1H, while the beginning of the recording location for the horizontal sync pulse preceding line 81 of the field occupying the illustrated segment of convolution $c_3$ is shifted from $R_o$ by an arcuate distance of 0.2h. These shifts are again in direction opposite to the groove motion direction $d$.

Accordingly, the horizontal sync pulse recording locations in successive convolutions of the spiral information track of recorded disc 70 and its replicas are not radially aligned, but rather are staggered, convolution-to-convolution, in a manner establishing a spiral alignment.

FIG. 3 illustrates record playback apparatus that may be advantageously employed in recovery of signals from a video disc record 70', replicated from a master recording disc 70 of the FIG. 2 form (as by use of the replication methods discussed in the aforesaid Clemens patent), pursuant to an illustrative embodiment of record player aspects of the present invention.

In the player arrangement of FIG. 3, the replica disc 70' is supported by a turntable 105. The turntable 105 is rotated at a substantially constant playback rotation rate by a suitable rotational drive mechanism in which the motive power is supplied by a synchronous motor 103, energized by alternating current supplied by an alternating current source 101. Illustratively, source 101 is the house current supply (i.e., mains supply) for the record player's site, and the frequency of the energizing current $f_p$ is the power line frequency (i.e. mains frequency) provided for local current distribution. The rotation rate $f_t$ established for disc 70' by the rotational drive provided by synchronous motor 103 corresponds to an integral submultiple of $f_p$.

a signal pickup 109 is provided for traversing the successive convolutions of the spiral information track of the rotating disc record 70' to recover the recorded signal information. Illustratively, the signal pickup 109 is a stylus with a groove-entering tip of the general form described in the aforesaid Clemens patent, and incorporates an electrode which cooperates with material of the disc record 70' to establish capacitance variations representative of the recorded signal information as the groove bottom geometry variations constituting the recorded information track pass beneath the stylus. Pickup circuits 110, which may illustratively be of the form disclosed in th copending U.S. patent application of D. J. Carlson, et al., Ser. No. 451,103, filed Mar. 14, 1974, now U.S. Pat. No. 3,872,240, convert the capacitance variations to electrical signal variations (of a form generally corresponding to that of the recording signal provided at terminal R in the recording apparatus of FIG. 1).

The signal output of pickup circuits 110 is supplied to a pair of bandpass filters 121, 131. Bandpass filter 121 is provided with a passband encompassing the relatively low frequency sound carrier deviation range and appropriate adjacent sideband regions. The signal portion selectively passed by filter 121 is applied via a limiter 123 to a sound carrier FM demodulator 125. The recorded FM sound carrier is demodulated to recover audio signals which appear at the demodulator output terminal A. The audio signals at terminal A are supplied to appropriate audio signal utilization circuits 127.

Bandpass filter 131 is provided with a passband encompassing the relatively high frequency picture carrier deviation range and appropriate adjacent sideband regions. The signal portion selectively passed by filter 131 is applied via a limiter 133 to a picture carrier FM demodulator 135. The recorded FM picture carrier is demodulated to recover composite color video signals which appear at demodulator output terminal v. The composite color video signals at terminal V are supplied to appropriate composite color video signal utilization circuits 137.

Illustratively, the utilization circuits 127, 137 may comprise apparatus for processing the respective demodulator outputs to a form suitable for application to the antenna terminals of a conventional color television receiver, so as to permit picture display and sound reproduction by the receiver. Reference may be made to the copending U.S. patent application of John G. Amery, Ser. No. 506,446, filed Sept. 16, 1974, now U.S. Pat. No. 3,938,179, for an illustrative showing of suitable apparatus for processing composite color video signals from a form appropriate for recording to a form appropriate for receiver use. Reference may also be made to U.S. Pat. No. 3,775,554, issued to Bernard Hjortzberg on Nov. 27, 1973, for a disclosure of transmitter apparatus suitable for use in converting the processed video and audio signals to a modulated RF carrier form suitable for antenna application purposes.

Pursuant to an aspect of the present invention, the recovered composite color video signals appear at terminal V with a field repetition rate $f_{v'}$ which is not harmonically related to the turntable rotation rate $f_t$. That is, the nominal turntable rotation rate ($f_t$) differs from an integral submultiple of the field rate ($f_{v'}$) of the recovered video signal information by a selected small amount.

An illustrative value for the turntable rotation rate ($f_t$) is 7.5 rps (or 450 rpm), which results in the recovery of video signals from replica disc record 70' (when the latter has the specific form discussed in connection with FIG. 2) with a field repetition rate of approximately 59.94 fields per second (corresponding, for example, to the U.S. color broadcast field rate standard). The illustrative value of 7.5 rps for $f_t$ corresponds to an integral submultiple of a conventional power line frequency (60 Hz.) employed, for example, in the United States.

It will be seen that in the illustrative example given above, one is enabled through use of the present invention to employ a power line synchronous drive system for the playback turntable in the player's development of composite color video signals with a field rate asynchronously related to the power line frequency. Reference may be made to the copending U.S. patent application Ser. No. 504,486, filed on Sept. 10, 1974 for Robert J. Hammond, et al., now U.S. Pat. No. 3,912,283, for an illustration of relatively inexpensive apparatus that may be employed to effect rotational drive of turntable 105 in a power line frequency synchronous manner.

Illustratively, the composite color video signal processing apparatus incorporated in utilization circuits 137 includes a suitable sync separator circuit for separating horizontal synchronizing information from the composite color video signals appearing at terminal V, and developing a train of horizontal sync pulses at terminal H of the utilization circuits 137. One illustrative form of sync separator apparatus is shown, for example, in the copending U.S. patent application of Charles D. Boltz, Jr., Ser. No. 402,081, filed on Oct. 1, 1973, now U.S. Pat. No. 3,914,542.

By virtue of the aforementioned spiral alignment of sync pulse recording locations in successive convolutions of the information track of disc record 70', the pulse train provided at terminal H serves to indicate by a shift in phasing of the sync pulses a departure from the normal progression of track convolution traversals by signal pickup 109. That is, for example, if during the traversal of convolution $c_2$, the signal pickup 109 jumps to the inwardly adjacent convolution $c_3$, a shift of the sync pulses at terminal H to a new phase location, lagging the phase location that would be occupied if normal traversal of convolution $c_2$ had continued, occurs. An opposite shift to a leading phase location results if the pickup jump is oppositely directed to the outwardly adjacent convolution $c_1$. Reference may be made to the copending U.S. patent application Ser. No. 522,817, of Thomas W. Burrus, concurrently filed herewith an entitled "Locked Groove Detection And Correction In Video Disc Playback Apparatus", and now issued as U.S. Pat. No. 3,963,860, for an illustration of apparatus that may advantageously employ the noted indication provided by the signals at terminal H.

Where "real time" recording is employed in the recording apparatus, illustrative values for recording turntable rotation rate ($f_R$) and source field rate ($f_V$) of 7.5 rps and 59.94 Hz., respectively, will provide a record 70 of the specific form discussed in connection with FIG. 2. However, where required, for example by limitations on recording beam intensity and/or sensitivity of the electron beam sensitive material employed in the groove of disc 70, a slower-than-real-time recording mode may be employed, with the recording turntable rotation rate a fraction (e.g., 1/21) of the intended playback disc rotation rate. In such an instance, the recording signal parameters are subject to division by the involved time expansion factor (e.g., 21).

In an illustrative application of the principles of the present invention to the aforesaid slower-than-real-time recording mode, where $f_v$ corresponded to 59.94 Hz. divided by 21, the recording turntable rotation rate ($f_p$) was maintained at 7.5 rps divided by 21. Such maintenance was effected using: a tachometer disc 36 with 10,800 markings (37) regularly spaced about its periphery; a reference frequency for the output of oscillator 60 of 1,000,000 Hz.; frequency division of the output of amplifier 42 by a factor of 23 in frequency divider 44; and frequency division of the output of oscillator 60 by a factor of 5,963 in frequency divider 61.

While the present invention has been specifically described above in terms of application to a video disc system of the capacitance type described in the previously mentioned Clemens patent, it should be appreciated that the principles of the present invention may also be employed to advantage in video disc systems of other types (e.g., optical disc systems).

What is claimed is:
1. A composite video signal record comprising:
   a disc having a surface bearing a spiral information track;
   said information track containing recorded representations of successive frames of interlaced fields of composite video signals inclusive of horizontal sync signals recurring at a given line repetition rate, with each of said frames containing an odd integral number of line intervals;

said signal representations being distributed along the convolutions of said spiral information track in such manner that each convolution of said spiral information track contains composite video signals occupying an even integral number of frame intervals less the sum of a small integral number of line intervals and a predetermined fraction of a line interval, several times smaller than a half-line interval.

2. A record in accordance with claim 1 wherein said predetermined fraction is one-tenth, whereby locations representative of recorded horizontal sync signals in any given track convolution deviate from radial alignment with locations representative of recorded horizontal sync signals in an immediately adjacent track convolution by an arcuate distance occupied by one-tenth of a line interval of recorded composite video signal information having said line repetition rate.

3. A record in accordance with claim 1 wherein each of said successive frames comprises a pair of interlaced fields, wherein said integral number of frame intervals is four, and wherein said small integral number of line intervals is two.

4. A composite video signal record comprising:

a disc having a surface bearing a spiral information track;

said information track containing representations of recorded composite video signals inclusive of regularly recurring horizontal sync signals;

said signal representations being distributed along the convolutions of said spiral information track in such manner that (1) recorded horizontal sync signal locations in successive convolutions of said track are spirally aligned, and (2) the arcuate distance between an edge of any of said recorded horizontal sync signal locations and the corresponding edge of the nearest recorded horizontal sync signal location in an adjoining convolution of said spiral information track corresponds to that occupied by a predetermined portion of a line interval of recorded composite video signal information, said predetermined portion being several times smaller than a half-line interval.

5. A composite video signal record comprising:

a disc having a spiral groove in a major surface thereof;

said spiral groove containing an information track comprising geometric variations along the bottom of said groove representative of recorded composite video signal information inclusive of horizontal sync signals recurring at a given line repetition rate; and wherein the distribution of said geometric variations along the bottom of successive convolutions of said spiral groove is such that locations of geometric variations representative of recorded horizontal sync signals are spirally aligned in succssive convolutions of the spiral groove; and wherein said spiral alignment is such that geometric variations representative of recorded horizontal sync signals in any given groove convolution deviate from radial alignment with geometric variations representative of recorded horizontal sync signals in an immediately adjacent groove convolution by an arcuate distance several times less than that occupied by half a line interval of recorded composite video signal information having said line repetition rate.

6. A record in accordance with claim 5 wherein said arcuate distance corresponds to that occupied by one-tenth of a line interval of recorded composite video signal information having said line repetition rate.

* * * * *